United States Patent [19]

Baker et al.

[11] Patent Number: 4,755,129

[45] Date of Patent: Jul. 5, 1988

[54] TRIM IN PLACE THERMOFORMING ARRANGEMENT FOR PLASTIC ARTICLES

[75] Inventors: Philip S. Baker, Fairport; Roland De May; Stephen L. Goulette, both of Newark; Jonathan Gross, Canandaigua, all of N.Y.

[73] Assignee: Mobil Oil Corporation, New York, N.Y.

[21] Appl. No.: 23,512

[22] Filed: Mar. 9, 1987

[51] Int. Cl.⁴ .............................................. B29C 51/32
[52] U.S. Cl. ..................................... 425/292; 83/225; 264/160; 264/163; 425/298; 425/306; 425/398
[58] Field of Search ............... 425/292, 298, 299, 306, 425/305.1, 398, 525; 264/153, 160, 163, 294, 551; 83/82, 97, 225, 228, 513

[56] References Cited

U.S. PATENT DOCUMENTS

| | | | |
|---|---|---|---|
| 2,270,187 | 1/1942 | Dulmage | 425/292 X |
| 3,161,915 | 12/1964 | Thiel | 425/305.1 |
| 3,173,174 | 3/1965 | Edwards | 425/292 |
| 3,368,440 | 2/1968 | Griese | 83/513 |
| 3,461,761 | 8/1969 | Mojonnier | 264/103 X |
| 3,470,281 | 9/1969 | Knowles | 264/294 X |
| 3,640,666 | 2/1972 | Jope et al. | 425/306 X |
| 3,784,342 | 1/1974 | Merklinghaus | 425/292 |
| 3,808,927 | 5/1974 | Neil | 83/228 |
| 3,912,438 | 10/1975 | Padovani | 425/292 |
| 4,095,927 | 6/1978 | Roberg et al. | 425/525 |
| 4,104,349 | 8/1978 | Hillgenberg | 264/163 X |
| 4,127,378 | 11/1978 | Meadors | 425/398 |
| 4,242,074 | 12/1980 | Lake | 264/163 X |
| 4,244,915 | 1/1981 | Boardman | 425/292 X |
| 4,391,171 | 7/1983 | Wendt | 83/82 |
| 4,442,064 | 4/1984 | Myers et al. | 264/551 |
| 4,526,074 | 7/1985 | Johnson | 83/97 |

FOREIGN PATENT DOCUMENTS 186016  7/1986  European Pat. Off. ............ 264/163

Primary Examiner—Richard L. Chiesa
Attorney, Agent, or Firm—Alexander J. McKillop; Michael G. Gilman; Charles J. Speciale

[57] ABSTRACT

An arrangement for the thermoforming of molded plastic articles from a continuous web of a thermoplastic material, and more particularly, a trim in place thermoforming arrangement in which the plastic articles are simultaneously molded and at least substantially or completely separated from the remaining thermoplastic web material. A high degree of alignment and precision is obtained between cooperating cutting blades employed in the trimming of the thermoformed articles, because of a unique self-aligning or floating support structure of at least one of the cutting blades operating in conjunction with the thermoforming apparatus. The self-aligning action provided for between the slidingly contacting cutting blades allows for an automatic compensation for any temperature changes and blade wear encountered during operation, and with only one movable part being required for the trim in place device.

4 Claims, 4 Drawing Sheets

TRIM IN PLACE THERMOFORMING ARRANGEMENT FOR PLASTIC ARTICLES

BACKGROUND OF THE INVENTION

1. Field of the Invention

The present invention relates to an arrangement for the thermoforming of molded plastic articles from a continuous web of a thermoplastic material, and more particularly, relates to a trim in place thermoforming arrangement in which the plastic articles are simultaneously molded and at least substantially or completely separated from the remaining thermoplastic web material.

The continually increasing demands on industry and commerce for supplying consumers with numerous kinds of molded plastic articles for the most divergent uses, such as plastic dishes, cups, utensils and various types of containers, has generated a requirement for the development of more efficiently operating equipment which will afford the rapid and inexpensive thermoforming or molding of such articles from a continuously or intermittently advanced continuous web or sheet of a thermoplastic material. In many instances, the articles are thermoformed or molded in a first forming station through the utilization of mutually cooperating male and female molding dies, and thereafter the entire thermoplastic sheet material together with the molded plastic articles, conveyed to a separate trimming station in which the molded articles are separated from the remaining sheet material by a trimming procedure implemented through the employment of suitable trimming cutters or blades.

In order to improve upon the foregoing, apparatus has been developed in this technology, in which the thermoformed or molded plastic articles are at least substantially, and even completely separated from the thermoplastic sheet material while the molded articles are still in the thermoforming or molding station of the apparatus. This procedure eliminates the necessity for the provision of separate apparatus for trimming the articles from the thermoplastic sheet material at a different location from the molding station, and is commonly referred to in the technology as a trim in place molding or thermoforming operation.

Among the different types of thermoforming apparatus which are currently employed for the trim in place operation of cutting or separating the thermoformed or molded articles from the remaining thermoplastic sheet material, in essence, the scrap material remainder, are those which completely separate the molded plastic article from the sheet material, thereby necessitating the separate step of removing the separated articles from the interspace between the cooperating molding die members while advancing the remaining sheet material. Alternatively, other types of trim in place molding apparatus contemplate the material articles being only substantially separated from the remaining sheet material so as to adhere thereto at one or more locations whereby the entire web of sheet material inclusive of the molded articles are advanced out of the trim in place thermoforming station of the apparatus, and the articles are then subsequently separated either manually or automatically from the remaining thermoplastic sheet material.

Although the methods of employing such apparatus for the trimming in place of the molded articles from the remaining thermoplastic sheet material have proven themselves to be generally satisfactory in use, the cutting devices which are employed for the trim in place operation are subjected to extensive wear during the continual and repetitive utilization thereof, as a consequence of thermal stresses and misalignments and the like, thereby frequently rendering current types of such apparatus uneconomical.

Generally, such trim in place thermoforming devices or apparatus employ mutually cooperating interengageable cutting blade members, which are attached to, respectively the male and female molding die members, and which circumferentially encompass the molded plastic article which is to be cut or separated out of the thermoplastic sheet material, and possess an article-trimming configuration substantially in conformance with the peripheral dimensions of the article. Hereby, during the thermoforming sequence effecting the molding of the articles, the cutting blade members have cutting edges come into sliding or shearing surface contact so as to essentially shear the molded article from the sheet material. Such shearing surfaces on the cutting blade members are generally required to be within close tolerances and in perfect alignment during operation and are subject to the need for implementing a secondary mold action to allow for the sliding or shearing interaction of the blade cutting surfaces. The undue amount of wear normally encountered by cutting blades which are employed in trim in place operations, frequently necessitates their replacement by other blades, and the refinishing or regrinding of the cooperating cutting blade surfaces thereby increasing the cost of operation because of the necessity for extensive periods of downtime of the entire apparatus for the replacement of the trim in place cutting blades, and the additional expenditures necessitated by the refinishing of the worn blades.

Furthermore, according to presently employed trim in place thermoforming apparatus and tools, the fact that the trimming or cutting blades are frequently subjected to undue amounts of wear, frequently produces either an uneven or incomplete cut through the plastic material extending about the periphery of the plastic molded article, so as to either leave rough and unfinished-looking or unsightly rims or edges extending about the article, or alternatively, incompletely cuts through the sheet material at various locations so as to render difficult the separation of the molded article from the remainder of the thermoplastic sheet material.

2. Discussion of the Prior Art

Among various prior art trim in place thermoforming apparatuses of the type under consideration herein, some are of particular significance.

Jope, et al. U.S. Pat. No. 3,640,666 discloses a trim in place thermoforming apparatus in which a continuous sheet of a thermoplastic film material is advanced between sets of mutually cooperating or complementary male and female molding die members which are adapted to be reciprocated towards and away from each other so as to effect the thermoforming of molded articles in the film material during a closing stroke between the molding dies. Concurrently with the thermoforming sequence, a pair of cooperating blade members mounted on the respective die members compress the film material about the periphery of each molded article so as to allow for the ready separation of each molded article from the remaining sheet material in the absence of any rough or unsightly peripherally extending rims or edges on the articles. Although the disclosed structure is designated as a socalled trim in place thermoforming apparatus, the trimming blades do not actually cut through the material so as to separate the molded article from the sheet material, but rather is designed to merely produce a compression of the thermoplastic material about the circumference of the molded article to facilitate it to be bent downwardly and thereafter manually separated from the sheet material. There is no provision of a sharp cutting or shearing action provided by the trim in place separation of molded articles in a manner analogous to that of the present invention, and wherein a cutting blade support structure is provided to always maintain the cutting or trimming blade components in a substantially aligned and relative low-wear position with respect to each other; thereby affording an enhanced degree of accuracy and precision in trimming the molded article from the sheet material, while concurrently maintaining the wear on the components of the trim in place cutting blade structure to an absolute minimum.

Dulmage U.S. Pat. No. 2,270,187 discloses a machine for drawing plastic articles from a flat thermoplastic plate or sheet material, and concurrently trimming the article, by means of an annularly extending cutter, from the remaining sheet material, so as to thereby carry out a simultaneous drawing and trimming operation. The annular trimming blade of the cutter employed in this patent requires the maintaining of an extreme close degree of precision or tolerance relative to a stationary encompassing ring, and is subject to a considerable amount of wear which will adversely effect the long-term or continual operation of the apparatus.

Knowles U.S. Pat. No. 3,470,281 relates to a method for forming a flanged container or the like, in which a shearing unit is employed for the subsequent trimming of a molded plastic article from a plastic sheet material. This is not in any manner analogous to the trim in place arrangement pursuant to the present invention.

Griese U.S. Pat. No. 3,368,440 discloses an anvil-type shearing machine for removing articles from sections of a plastic material, but is not analogous to the inventive trim in place thermoforming arrangement.

Roberg, et al. U.S. Pat. No. 4,095,927 discloses a thermoforming apparatus for forming molded articles which also incorporates a trimming device possessing blades which are laterally fixed relative to the molding unit. This type of trimming operation also requires extreme precision and close tolerances for the cutting unit while concurrently imparting a high degree of wear to the cutting blades.

Meadors U.S. Pat. No. 4,127,378 discloses a cold-forming apparatus for thermoplastic sheeting, in which the edge of a molded article is adapted to be heated and thereafter trimmed. This disclosure does not provide for the unique trim in place structure pursuant to the present invention.

Although numerous other types of apparatus, devices and methods are currently in use with regard to the trimming of thermoplastic articles which are molded or thermoformed into a web of a thermoplastic sheet material, none of these disclose a trim in place arrangement similar to that provided for by the present invention.

SUMMARY OF THE INVENTION

Thus, the present invention provides for a novel trim in place arrangement for the substantially simultaneous trimming or separating of plastic articles being thermoformed in a thermoplastic film or sheet material, which enables a high degree of alignment and precision to be obtained between cooperating cutting blades employed in the trimming of the thermoformed articles, because of the unique self-aligning or "floating" support structure of at least one of the cutting blades operating in conjunction with the thermoforming apparatus. The self-aligning action provided for between the slidingly contacting cutting blades allows for an automatic compensation for any temperature changes and blade wear encountered during operation, and with only one movable part being required for the trim in place device.

Basically, the inventive trim in place thermoforming arrangement incorporates, for each plastic article which is to be molded, a pair of complementary male and female molding die members which are adapted to be reciprocated towards each other in order to thermoform a molded article into the surface of a thermoplastic sheet material advanced intermediate the molding die members when the latter are in an opened position, and with the male and female die members incorporating the novel trim in place cutting structure for at least substantially separating or trimming the molded article from the thermoplastic sheet material in a generally simultaneous operating procedure with the thermoforming sequence. For this purpose, the complementary male and female molding dies each incorporate annular or ring-shaped cutter elements which are adapted to cooperate in sliding surface contact during the closing movement of the molding dies, and resultingly shearing through the thermoplastic material encompassing the circumference of the molded article in a highly accurate manner. In order to achieve the required degree of trimming accuracy, the "self-aligning" or "floating" support for the trim in place device contemplates that at least one of the cutting or trimming blades is spring-mounted for some extent of freedom of radial movement relative to the cooperating cutting blade which is fixed mounted on the other molding die member, and in which the surfaces of the trim or cutting blade members which slidingly contact each other are dimensioned so as to be in a substantial interference fit during the trimming operation.

The foregoing will at all times, ensure a perfect trim alignment of the cutter blades, irrespective of the configuration of the molded plastic article; in essence, whether round, oval, parallelepiped or any other configuration;

- impart a self-aligning action to the trimming cutters, so as to render any mechanical alignment between the complementary molding die members unnecessary and also rendering any thermoforming mold tolerances uncritical;
- the novel floating or "spring" interference fit between the interengaging trim cutting blades allows for an automatic compensation for dimensional changes caused by temperature variations and wear, and also avoids the necessity for any secondary mold action in the trimming of the article;
- the structure also allows for only a partial trim in place about the circumference of the molded article through the formation of circumferentially spaced tabs formed along the trim line, which also permits a retrofit of existing thermoformers and molds, and permits for a direct interface with automatic parts handling apparatus, and for use with or without a trim press; and moreover, the entire trim in place thermoforming structure is simple in operation and in its construction, does not require any fasteners and is inexpensive to fabricate, and may be readily and easily maintained without any special installation skills or personnel.

Accordingly, it is an object of the present invention to provide a novel trim in place arrangement for thermoplastic molded articles which will allow for an extremely high degree of precision in the trimming of the molded articles.

Another object of the present invention is to provide a self-aligning trim in place arrangement of the type described herein which operates in conjunction and simultaneously with the thermoforming of plastic articles which are molded from a thermoplastic sheet material.

Another object is to provide a novel trim in place thermoforming arrangement incorporating novel self-aligning trimming or cutting blades, which allow for a perfect trim alignment with a minimum degree of blade wear through the "floating" mounting of at least one of the interengaging trimming blades on one of the molding die members of the thermoformer.

BRIEF DESCRIPTION OF THE DRAWINGS

Reference may now be had to the following detailed description of preferred embodiments of the invention illustrative of a novel trim in place arrangement, taken in conjunction with the accompanying drawings; in which.

DETAILED DESCRIPTION

Figure 1:
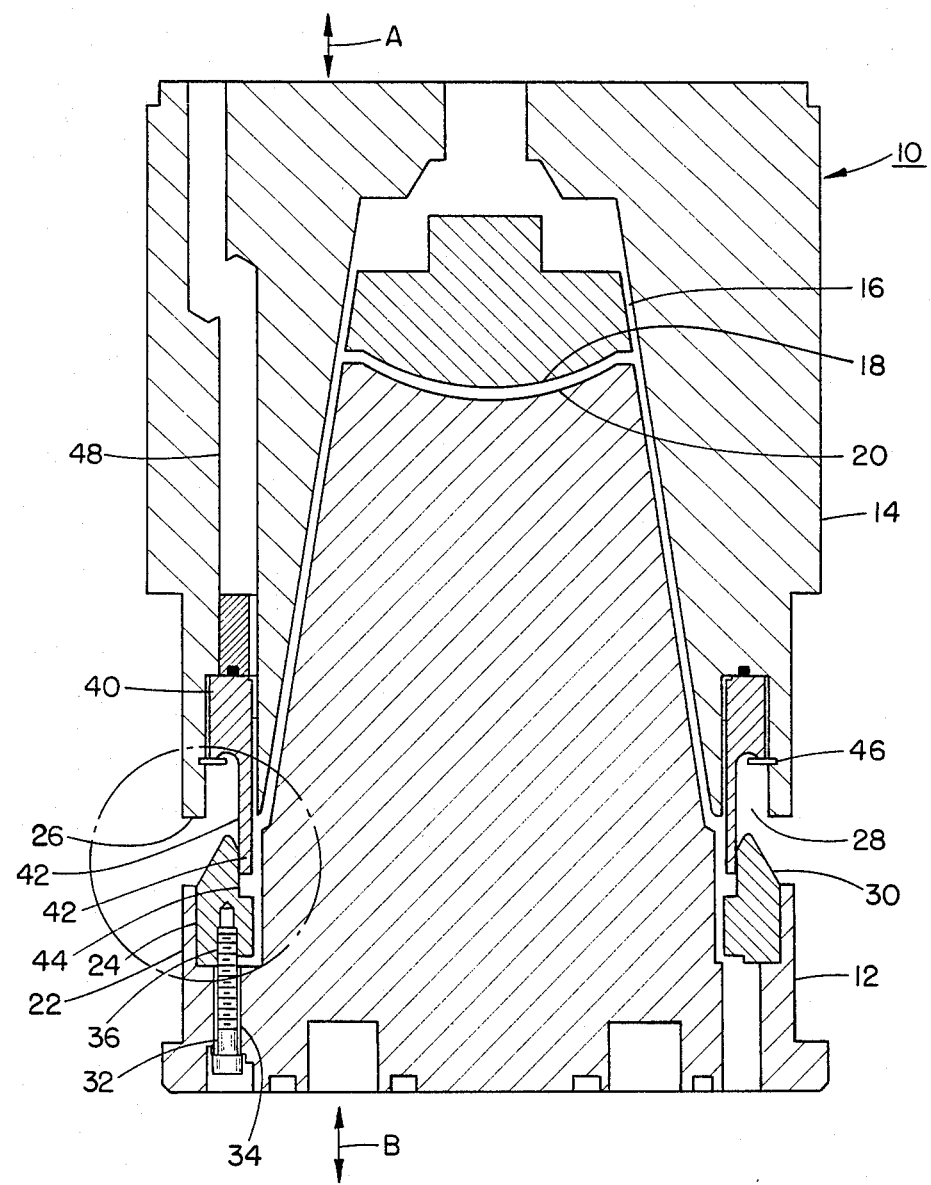
FIG. 1 illustrates a first embodiment of the trim in place thermoforming arrangement pursuant to the invention, shown in longitudinal cross-section, with the molding dies thereof being shown in a closed operative position.
Figure 2:
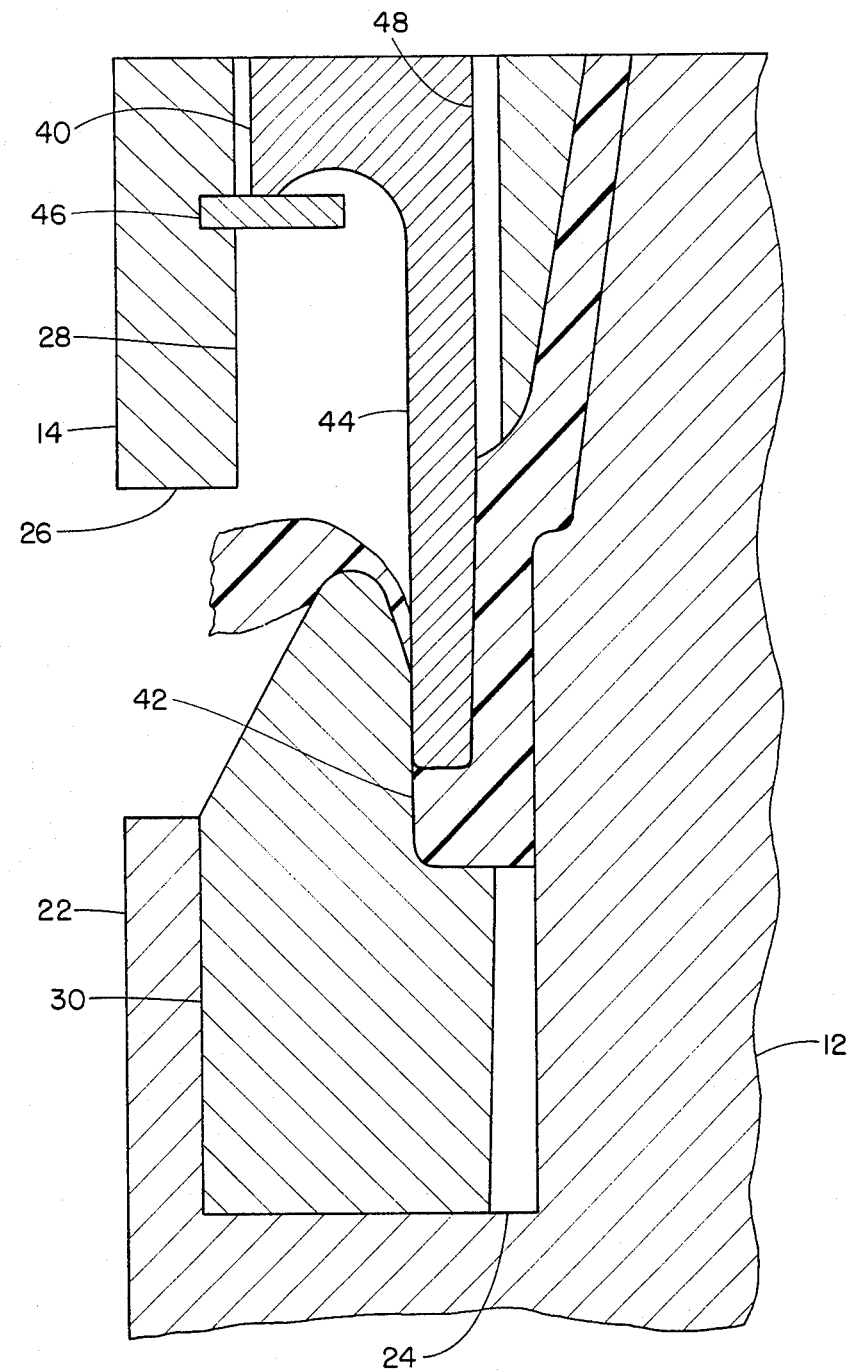
FIG. 2 illustrates an enlarged fragmentary sectional view of the encircled portion in FIG. 1.

Referring now in detail to the drawings, and particularly FIGS. 1 and 2, there is shown a trim in place thermoforming arrangement 10 for the thermoforming of molded plastic articles, which are to be produced from a continuous web or sheet of a thermoplastic material, usually employed in the forming of articles such as cups, plates, containers or the like. In this connection, although the arrangement is illustrated and described for the molding of a single plastic article, it is readily understandable that a plurality of similar or identical simultaneously operating thermoforming mold units for the concurrent production of a plurality of molded plastic articles may be located in any suitable array.

Essentially, the trim in place thermoforming arrangement 10 includes a male molding die member which is adapted to be reciprocated in the direction of arrow A, and a complementary female molding die member 14 adapted to be reciprocated in the direction of arrow B in synchronism with the reciprocatory movement of the male molding die member 12 and with the advance of a layflat thermoplastic sheet material between the molding die members 12, 14 in the separated or opened condition thereof.

The male molding die member 12 has an external surface configuration which is contained to form the internal wall structure of a plastic article thermoformed or molded from the sheet material, whereas the female molding die member 14 has an internal configuration, and is also provided with an insert 16 having a surface 18 facing towards the upper end surface 20 of the male molding die member 12 in spaced relationship between the molding die members so as to form the molded plastic article therebetween. To this extent, the structure and complimentary configurations and the functions of the cooperating male and female molding die members, and the devices for the operation thereof (not shown), is conventional in the plastics molding technology and is not described in detail herein.

The male molding die member 12 is provided with an annular radially outwardly extending flange 22. Formed in the flange 22 is an annular recess 24 having the opening thereof facing upwardly towards the female molding die member 14.

Similarly, the female molding die member 14 has an end surface 26 provided with an annular recess 28 whose opening faces towards and is concentrically aligned with the annular recess 24 in the male molding die member 12.

The inventive trim in place tooling which constitutes a portion of the thermoforming arrangement 10 has an annular upstanding trimming or cutting blade 30 fixedly positioned within the recess 24 in the male molding die member 12, with the outer circumferential surface thereof in surface-engaging contact with the inner circumferential wall of the recess, and with the bottom of the cutting blade 30 being seated on the bottom of the recess 24. The cutting blade 30 is fastened in position by means of a plurality of circumferentially spaced, axially extending fastening screws 32 extending through bores 34 provided in the flange 22 of the male molding die member 12, and which engage in threaded blind bores 36 in the cutting blade 30.

Arranged in the annular recess 28 of the female molding die member 14 is a downwardly depending ring-shaped or annular cutting blade element 40 which has an external cylindrical surface portion 42 adapted to engage in sliding contact and with an interference fit, an internal cylindrical surface portion 44 on the annular cutting blade 30 when the molding die members 12, 14 are moved into their closing or thermoforming positions. The ring-shaped cutting blade element 40 which is located in the annular recess 28 within the female molding die member 14 has external and internal diametrical dimensions or a thickness enabling the cutting blade member 40 to be laterally movable to some extent within the recess 28 so as to be essentially self-alignable in a "floating" or spring-like interference fit with the complementary cutting blade 30 in the male molding die member 12 when the blade surface portions 42, 44 are in sliding contact. The annular or ring-shaped cutting blade member 40 in the female molding die member 14 is maintained secured in the recess 28 against axial displacement through the intermediary of a suitable spring ring or circlip 46. The bottom of the annular recess 28 in the female molding die member 14 communicates with a passageway 48 which has a vacuum applied thereto, and with a seal providing a sealing engagement between the bottom of the recess 28 and the bottom surface of the "floatingly" supported cutting blade member 40.

The operation of the inventive trim in place thermoforming arrangement 10, as illustrated in FIGS. 1 and 2, is essentially as follows:

A web or sheet of a suitable thermoplastic material is advanced intermediate the male and female die members 12, 14 when they are in a fully separated or opened condition so as to leave a completely open gap therebetween, allowing for the advance and positioning of the thermoplastic sheet material in the thermoforming arrangement 10. Thereafter, the male and female molding die members 12, 14 are advanced towards each other along the direction of arrows A and B through the action of a suitable mechanism (not shown) operating in synchronism with the advance of the thermoplastic material, while concurrently being heated to the desired molding temperature for thermoforming the plastic article; in this instance a cup-shaped article.

The gap which is present between the facing surfaces of the male molding die member 12 and those of the female molding die member 14 defines the frusto-conical side wall structure of the molded cup, the bottom portion and concurrently forms the rim of the cup.

As the cooperating molding die members 12, 14 approach their final closing stage, the cutting blade 30 of the male molding die, and the "floatingly" supported cutting blade member 40 arranged in the female molding die member have their mating surfaces 42, 44 slidingly contact each other under an interference fit so as to, as clearly shown in FIG. 2, shear the molded article which has been formed between the mated molded die members 12, 14 from the remaining thermoplastic sheet material.

The floating or "spring" interference fit between the sliding contacting surfaces 42, 44 of the two trim in place cutting blades 30, 40, because of the "floating" or laterally movable support of the annular or ring-like cutting blade member 40 in the recess 28 of the female molding die member, will thereby provide a self-aligning contacting engagement which will compensate for any slight misalignment and for temperature changes and surface wear encountered between the contacting surfaces 42, 44.

Upon completion of this operating sequence, the molding die members 12, 14 are separated by being displaced in opposite directions, as shown by arrows A and B, the molded article is removed, and the remaining thermoplastic sheet material is advanced to allow for the formation of a subsequent molded article or plurality of articles.

Figure 3:
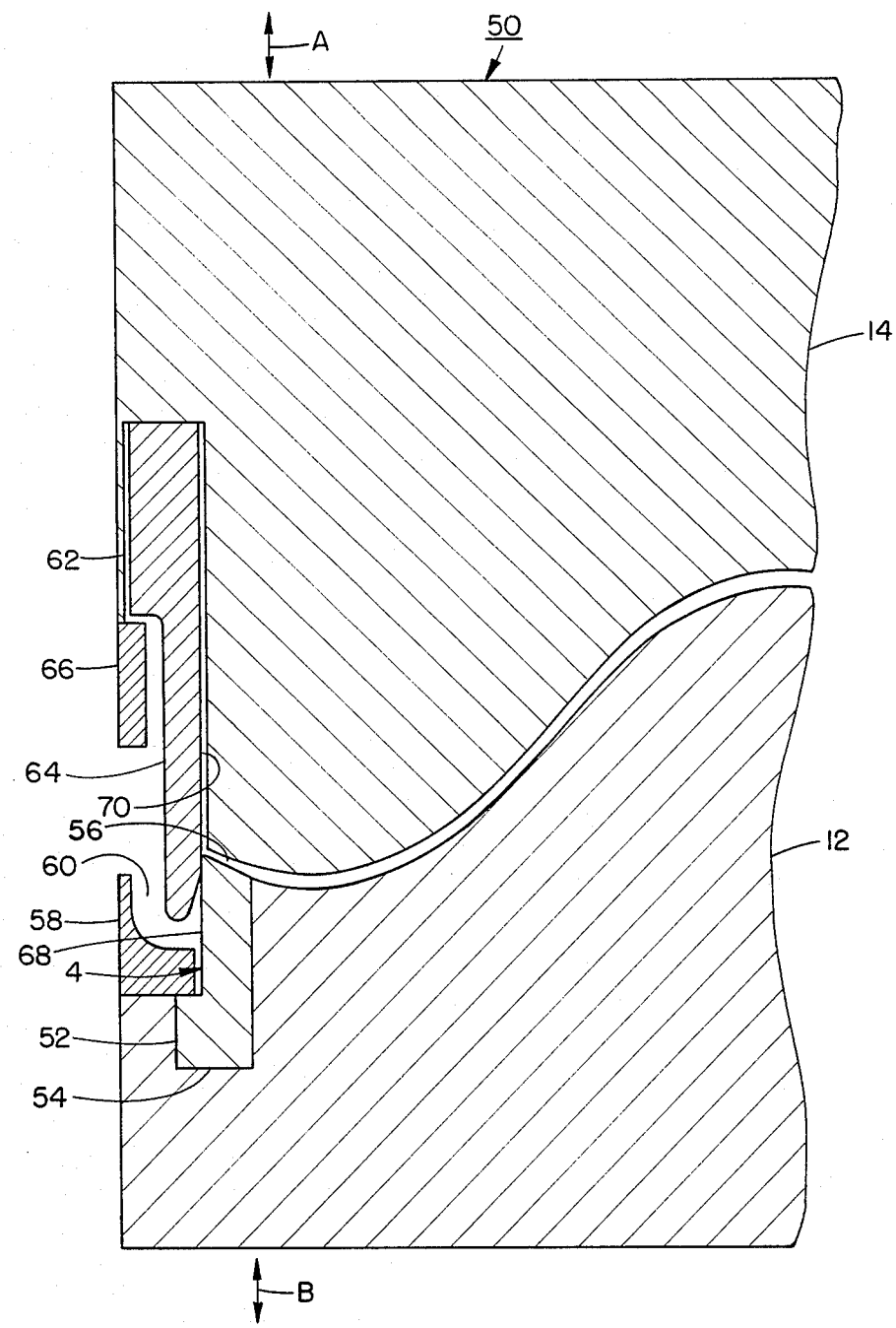
FIG. 3 illustrates a modified trim in place structure shown in a view similar to that of FIG. 2.
Figure 4:
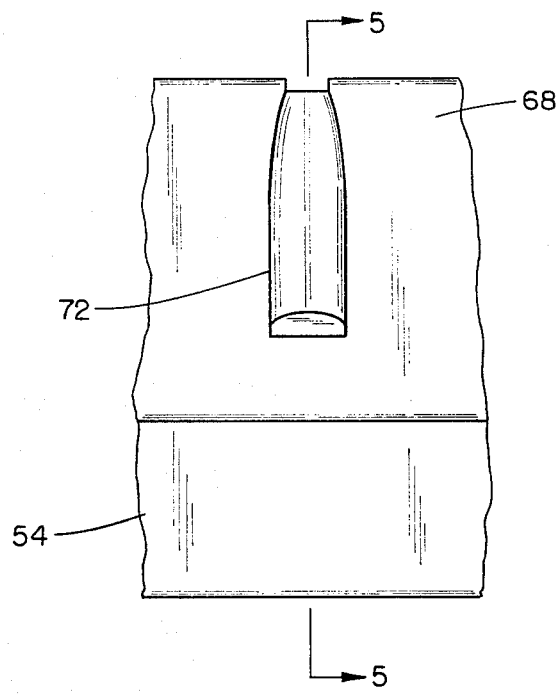
FIG. 4 is a detail, on an enlarged scale, in the direction of arrow 4 in FIG. 3.
Figure 5:
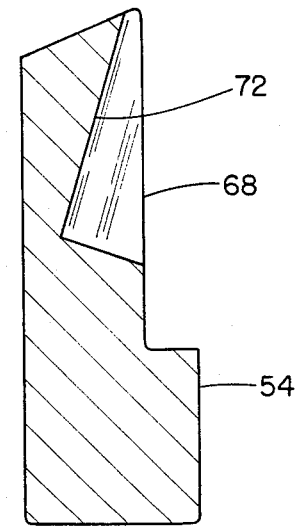
FIG. 5 is a sectional view taken along line 5—5 in FIG. 4.

The embodiment of the trim in place thermoforming arrangement 50 illustrated in FIGS. 3 through 5 is substantially similar in operation, and similar or like components are identified with the same reference numerals as in FIGS. 1 and 2.

In this instance, wherein the article to be molded is generally in the shape of a dished plate, the male molding die member 12 has an annular recess 52 formed therein, in which there is fixed an upstanding annular cutting plate 54 having an upper radial surface 56 shaped in conformance with the configuration of the molded article surface, and with an external ring 58 mounted thereabout defining an annular groove 60.

Similarly, the female molding die member 14 includes an annular recess 62 in which a ring-shaped or annular cutter blade element 64 is supported for some radial play or displacement, and held in place against axial movement by means of the shoulder on an external flange 66 mounted on the female molding die member 14.

Upon closing of the trim in place thermoforming arrangement 50, in a manner similar to that described with regard to FIGS. 1 and 2, the sliding or shearing contact between the mating surface portions 68, 70 cutting elements 54, 64 will cause a shearing separation between the molded article and the remainder of the thermoplastic sheet material.

In this instance, the finish-molded plastic article can be maintained attached to the remaining thermoplastic sheet material by means of connecting tabs through the provision of a plurality of circumferentially spaced cutouts or slots 72 which are formed in the surface 68 of the cutting element 5 on the male molding die member 12, which will permit the material of the molded article to remain attached to the material of the sheet of thermoplastic since there is no shearing contact at those particular locations between the sliding surface portions 68, 70.

As a result, after the formation of the molded article, upon further advancing of the sheet material, the molded article is pulled out of the open space between the die members, and may then be manually or automatically separated from the sheet material by being simply tearing the formed tab connections.

From the foregoing it is readily apparent that the entire trim in place thermoforming arrangement is of a simple construction in which the self-aligning or "floating" support of the cutting blade member mounted on one of the complementary molding die members will reduce blade wear and allow for a simple configuration thereof without the need for any fasteners, for a low cost of fabrication, easier maintenance and no particular skills for its installation.

It is also possible to contemplate within the scope of the invention, that the entire trim in place structure be reversed in that the self-aligning, floatingly mounted blade be arranged on the male molding die member rather then on the female molding die member.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A trim in place thermoforming arrangement for the sequential molding and trimming of plastic articles from a generally continuous sheet of thermoplastic sheet material; comprising a thermoforming die assembly having male molding die means and complementary female molding die means reciprocatable towards and away from each other and having surface portions defining an article molding contour therebetween; said thermoplastic sheet material being postionable intermediate said male and female molding means for thermoforming said sheet material into molded articles; and first and second mutually self-alignable cutting means mounted on, respectively, said male and female molding die means coacting to at least substanitally separate the molded articles from said sheet material, said first cutting means comprising an annular upwardly extending cutting blade fixedly supported in annular recess formed in said male molding die means, and said second cutting means being an annular downwardly depending cutting blade movably supported in an annular recess formed in said female molding die means so as to be radially displaceable and engageable in a self-aligning interference fit with said upwardly extending cutting blade during the closing movement of said male and female molding die means.

2. An arrangement as claimed in claim 1, wherein said cutting blades have contacting sliding surface portions for effecting the shearing of said plastic material therebetween upon closing of said male and female molding die means.

3. An arrangement as claimed in cliam 2, wherein a plurality of circumferentially spaced cutouts are formed in the contacting surface portion of at least one of said cutting blades to facilitate the formation of connecting tabs between the molded articles and the sheet material.

4. An arrangement as claimed in claim 3, wherein said cutouts are arranged on the cutting blade which is mounted on said male molding die means.

* * * * *